United States Patent [19]
Nakagami et al.

[11] Patent Number: 5,819,190
[45] Date of Patent: Oct. 6, 1998

[54] GROUND LEVELING CONTROL SYSTEM FOR A BULLDOZER

[75] Inventors: Hiroshi Nakagami; Shigenori Matsushita; Shigeru Yamamoto, all of Hirakata, Japan

[73] Assignee: Komatsu Ltd., Tokyo, Japan

[21] Appl. No.: 609,048

[22] Filed: Feb. 29, 1996

Related U.S. Application Data

[62] Division of Ser. No. 129,080, Oct. 7, 1993, Pat. No. 5,621,643.

[30] Foreign Application Priority Data

Apr. 12, 1991 [JP] Japan ..................................... 3-108451

[51] Int. Cl.$^6$ .................................. G06F 7/70; E02F 3/76
[52] U.S. Cl. ................................. 701/50; 701/1; 172/4.5; 172/3; 172/7; 172/12; 83/13; 83/76.7
[58] Field of Search ........................ 364/424.07, 424.01; 172/4.5, 826, 793, 3, 7, 9, 815, 2, 779, 12; 83/617, 623, 639.1, 582, 640, 699.31, 25.1, 112, 431, 433, 524, 563, 13, 76.7, 499, 856, 949, 955, 508.3

[56] References Cited

U.S. PATENT DOCUMENTS

| | | | |
|---|---|---|---|
| 3,711,971 | 1/1973 | Martin | 37/417 |
| 4,053,018 | 10/1977 | Takeda | 172/4.5 |
| 4,157,118 | 6/1979 | Suganami et al. | 172/4.5 |
| 4,162,708 | 7/1979 | Johnson | 172/4.5 |
| 4,166,506 | 9/1979 | Tezuka et al. | 172/4.5 |
| 4,282,933 | 8/1981 | Sugunami et al. | 172/4.5 |
| 4,423,785 | 1/1984 | Kurihara et al. | 172/3 |
| 4,592,259 | 6/1986 | Görner et al. | 83/13 |
| 4,693,157 | 9/1987 | Looser | 83/431 |
| 4,864,895 | 9/1989 | Frank | 96/25.1 |
| 4,916,618 | 4/1990 | Stoltman | 364/426.031 |
| 5,174,385 | 12/1992 | Shinbo et al. | 364/424.07 |
| 5,219,411 | 6/1993 | Yamamoto et al. | 180/197 |
| 5,287,280 | 2/1994 | Yamamoto et al. | 364/426.029 |
| 5,293,944 | 3/1994 | Matsumoto | 172/2 |
| 5,297,649 | 3/1994 | Yamamoto et al. | 180/197 |
| 5,333,479 | 8/1994 | Yamamoto et al. | 172/3 |
| 5,465,639 | 11/1995 | Senbokuya | 83/34 |
| 5,467,829 | 11/1995 | Barton et al. | 364/424.07 |

FOREIGN PATENT DOCUMENTS

| | | |
|---|---|---|
| 48-78702 | 10/1973 | Japan . |
| 64-62525 | 9/1989 | Japan . |
| 3-43523 | 2/1991 | Japan . |

*Primary Examiner*—Jacques H. Louis-Jacques
*Attorney, Agent, or Firm*—Armstrong, Westerman, Hattori, McLeland & Naughton

[57] ABSTRACT

A ground leveling control system for a bulldozer, comprising: (a) a cutting edge position detector for detecting a position of a cutting edge of a blade with respect to the ground; and (b) a blade controller for controlling the blade to be lifted or lowered such that the cutting edge position of the blade detected by the cutting edge position detector is kept coincident with a preset target cutting edge position.

8 Claims, 9 Drawing Sheets

GROUND LEVELING CONTROL SYSTEM FOR A BULLDOZER

This is a divisional application of U.S. patent application Ser. No. 08/129,080 filed on Oct. 7, 1993, now U.S. Pat. No. 5,621,643.

DISCLOSURE OF THE INVENTION (1) Field of the Invention

The present invention relates to a ground leveling control system for a bulldozer and, more particularly, to a technique for ground leveling control by keeping the position of a cutting edge of the blade constant with respect to the ground during dozing operation by the use of a bulldozer.

(2) Description of the Prior Art

In conventional dozing operation by the use of such a bulldozer, the operator, who drives and operates the bulldozer, manually lifts or lowers the blade to perform digging/carrying and ground leveling with the cutting edge position of the blade being kept constant with respect to the ground.

SUMMARY OF THE INVENTION

Manual operation for lifting and lowering the blade to carry out ground leveling with the cutting edge position of the blade being kept constant with respect to the ground causes tremendous fatigue even to a skillful operator because he has to lift and lower the blade many times. Furthermore, such manual operation is so complicated that an unskilled operator would not only be exhausted but also would have great difficulty in carrying out the operation at all.

The invention has been made for the purpose of overcoming these problems and therefore one of the objects of the invention is to provide a ground leveling control system for a bulldozer in which no tremendous fatigue is caused to the operator during ground leveling in dozing operation and which can be easily operated with a simple method.

The above object can be achieved by a ground leveling control system for a bulldozer according to the invention, the system comprising:

(a) a cutting edge position detecting means for detecting a position of a cutting edge of a blade with respect to a ground; and (b) a blade controlling means for controlling the blade to be lifted or lowered such that the cutting edge position of the blade detected by the cutting edge position detecting means is kept coincident with a preset target cutting edge position.

For example, in an automatic driving mode in which the cutting edge position of the blade with respect to the ground is made coincident with a target cutting edge position, the blade is lifted or lowered by the blade controlling means such that the cutting edge position of the blade detected by the cutting edge position detecting means is kept coincident with a target cutting edge position that is either preset according to the cutting edge position of the blade detected by the cutting edge position detecting means or that is preset by a dial switch. With this arrangement, ground leveling in dozing operation can be performed by simple operation without causing tremendous fatigue to the operator.

Preferably, the cutting edge position of the blade detected by the cutting edge position detecting means and the preset target cutting edge position are respectively represented by an absolute straight frame angle, that is, an angle of straight frames with respect to the ground.

Preferably, the absolute straight frame angle detected as the cutting edge position of the blade by the cutting edge position detecting means is a moving average of angle data, the moving average being obtained by the cutting edge position detecting means in such a way that a relative straight frame angle that is an angle of the straight frames with respect to a vehicle body is first obtained based on an stroke positional data of a blade lift cylinder; the absolute straight frame angle is obtained from the relative straight frame angle and from a pitch angle of the vehicle body when it inclines back and forth; and an absolute straight frame angle, which varies time after time, is obtained and then the moving average of the absolute straight frame angle data over a period of time thus obtained is calculated.

During dozing operation, the blade controlling means is made to perform the automatic driving control of the blade in the automatic driving mode on condition that the transmission is placed in the first forward speed or the intermediate forward speed and that the blade is not in manual operation. This arrangement makes it possible to perform automatic driving only when a speed suitable for ground leveling such as the first forward speed or intermediate forward speed is selected in the automatic driving mode. Manual operation of the blade is carried out in preference to the automatic driving operation and therefore can be arbitrarily inserted at any time, interrupting the automatic driving operation.

BRIEF DESCRIPTION OF DRAWINGS

FIG. 1 is an external appearance of the bulldozer;

FIG. 2 is a skeleton diagram of a power transmission system;

FIG. 3 is a schematic block diagram of an overall construction;

FIG. 4, comprising of FIGS. 4A and 4B is a flowchart of a dozing program; and

FIGS. 5 to 11 are a graph showing a curved engine characteristic map; graph showing a pump correction characteristic map; graph showing a curved torque converter characteristic map; graph showing a pitch angle-load correction value characteristic map; graph showing a load control characteristic map; graph showing a ground leveling control characteristic map; and graph showing a load-ground leveling control weighted characteristic map, respectively.

DESCRIPTION OF THE PREFERRED EMBODIMENTS

With reference to the drawings, a ground leveling control system for a bulldozer according to a preferred embodiment of the invention will be hereinafter described.

Figure 1:
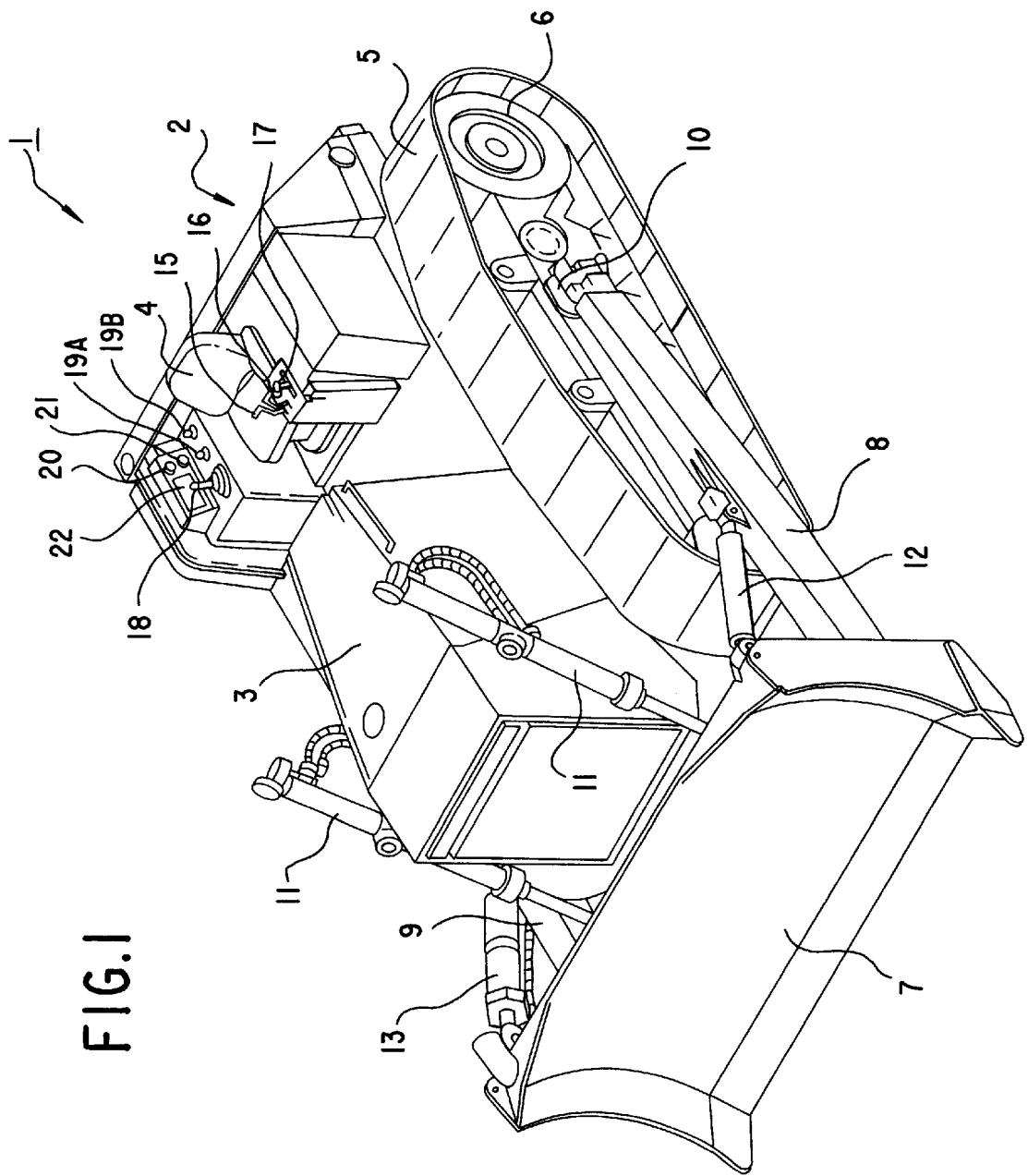
FIGS. 1 to 11 are for explaining a ground leveling control system for a bulldozer according to a preferred embodiment of the invention.

Referring to FIG. 1, there is shown an external appearance of a bulldozer 1 which is provided with, on a vehicle body 2 thereof, a bonnet 3 for housing an engine (not shown) and an operator seat 4 for the operator who drives the bulldozer 1. Both sides (i.e., the right and left sides when the vehicle body 2 is viewed in its moving direction) of the vehicle body 2 are provided with crawler belts 5 (the crawler belt on the right side is not shown) for running the vehicle body 2 so as to turn or move back and forth. These crawler belts 5 are independently driven by their respective corresponding sprockets 6 actuated by driving force transmitted from the engine.

There are provided straight frames 8, 9 for supporting a blade 7 at the forward ends thereof. The base ends of these right and left straight frames 8, 9 are pivotally supported at the right and left sides of the vehicle body 2 by trunnions 10 (the trunnion at the right side is not shown) in such a manner that the blade 7 can be lifted or lowered. Disposed between the blade 7 and the vehicle body 2 are right and left blade lift cylinders 11 forming a pair for lifting or lowering the blade 7. A brace 12 is disposed between the blade 7 and the left straight frame 8 and a blade tilt cylinder 13 is disposed between the blade 7 and the right straight frame 9. The brace 12 and the blade tilt cylinder 13 function to incline the blade 7 to the right and left.

There are provided a steering lever 15, a transmission shift lever 16 and a fuel control lever 17 on the left of the operator seat 4 when the vehicle body 2 is viewed in its moving direction. On the right of the operator seat 4, there are provided a blade control lever 18 for lifting, lowering the blade 7 and inclining it to the right and left; a first dial switch 19A for setting the magnitude of loads applied to the blade 7 by digginh and carrying and a second dial switch 19B for compensating for the set magnitude of loads by addition or subtraction of a correction value; an automatic driving mode pressing selector switch 20 for switching ON/OFF of the automatic driving mode for dozing operation; a lock-up selector switch 21 for switching ON/OFF of the lock-up of a torque convertor; and a display unit 22. Although it is not shown in the drawing, there is provided a decelerator pedal in front of the operator seat 4.

Figure 2:
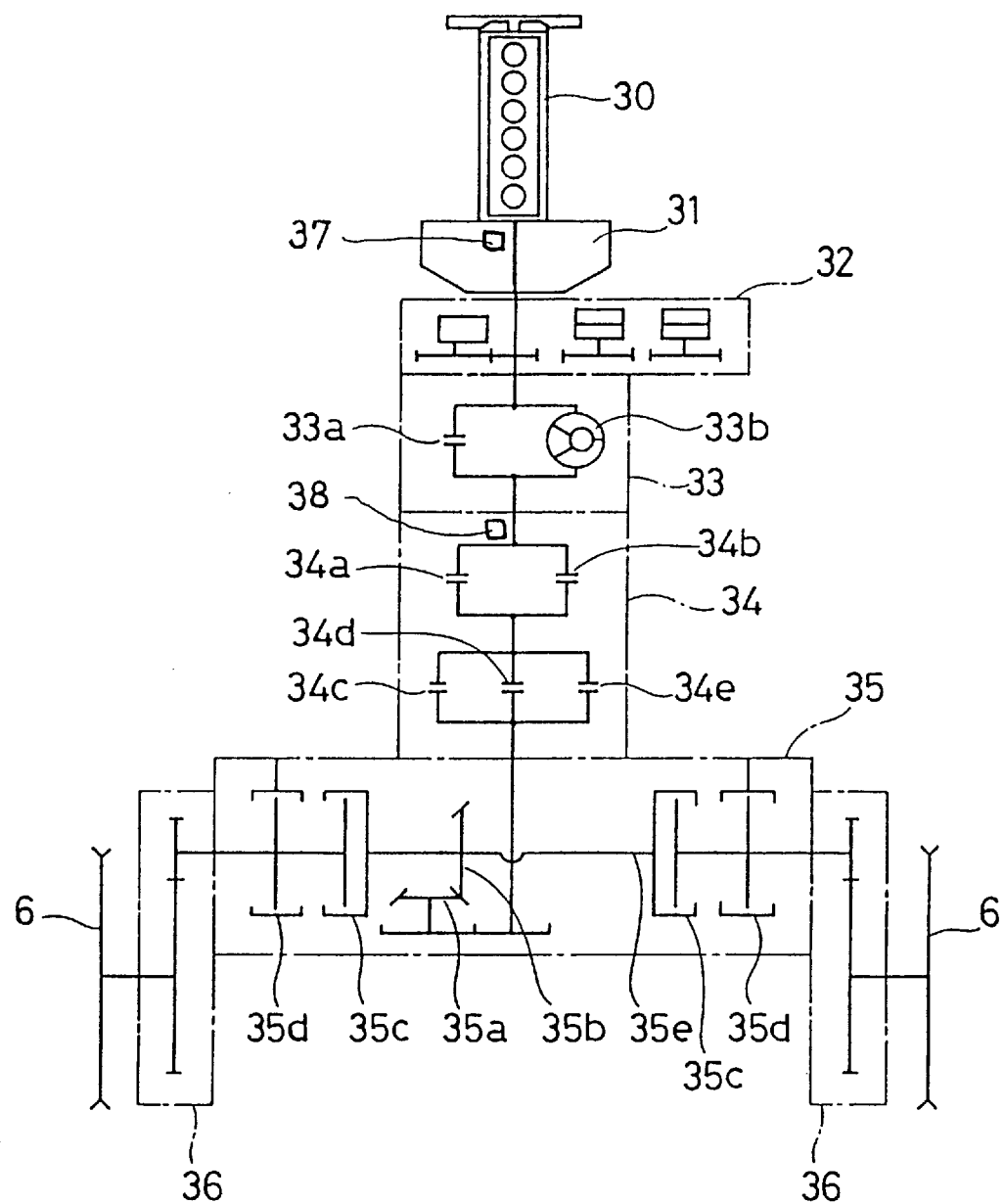

Referring to FIG. 2 which shows a power transmission system, a rotary driving force from an engine 30 is transmitted to a torque convertor with a lock-up mechanism 33 through a damper 31 and a PTO 32. The torque convertor with a lock-up mechanism 33 includes a lock-up mechanism 33*a* and a pump 33*b,* and the PTO 32 functions to drive various hydraulic pumps including hydraulic pumps for operational machines. The rotary driving force is then transmitted from an output shaft of the torque convertor with a lock-up mechanism 33 to a transmission 34 such as e.g., a planetary gear lubricated multiple-disc clutch transmission, an input shaft of which is connected to the above output shaft. The transmission 34 includes forward and reverse clutches 34*a,* 34*b* and first to third clutches 34*c* to 34*e* so that the revolution of the output shaft of the transmission 34 can be shifted in three stages in both forward and backward directions. The rotary driving force from the output shaft of the transmission 34 is transmitted to a steering mechanism 35 that includes a transverse shaft 35*e* on which disposed are a pinion 35*a,* bevel gear 35*b,* right and left steering clutches 35*c* forming a pair, and right and left steering brakes 35*d* forming a pair. Thereafter, the rotary driving force is transmitted to a pair of final reduction mechanisms 36 disposed on the right and left hands so that each of the sprockets 6 for running the crawler belts 5 is driven. Note that Reference numeral 37 denotes an engine revolution sensor for detecting the revolution speed of the engine 30 and Reference numeral 38 denotes a torque convertor output shaft revolution sensor for detecting the revolution speed of the output shaft of the torque convertor with a lock-up mechanism 33.

Figure 3:
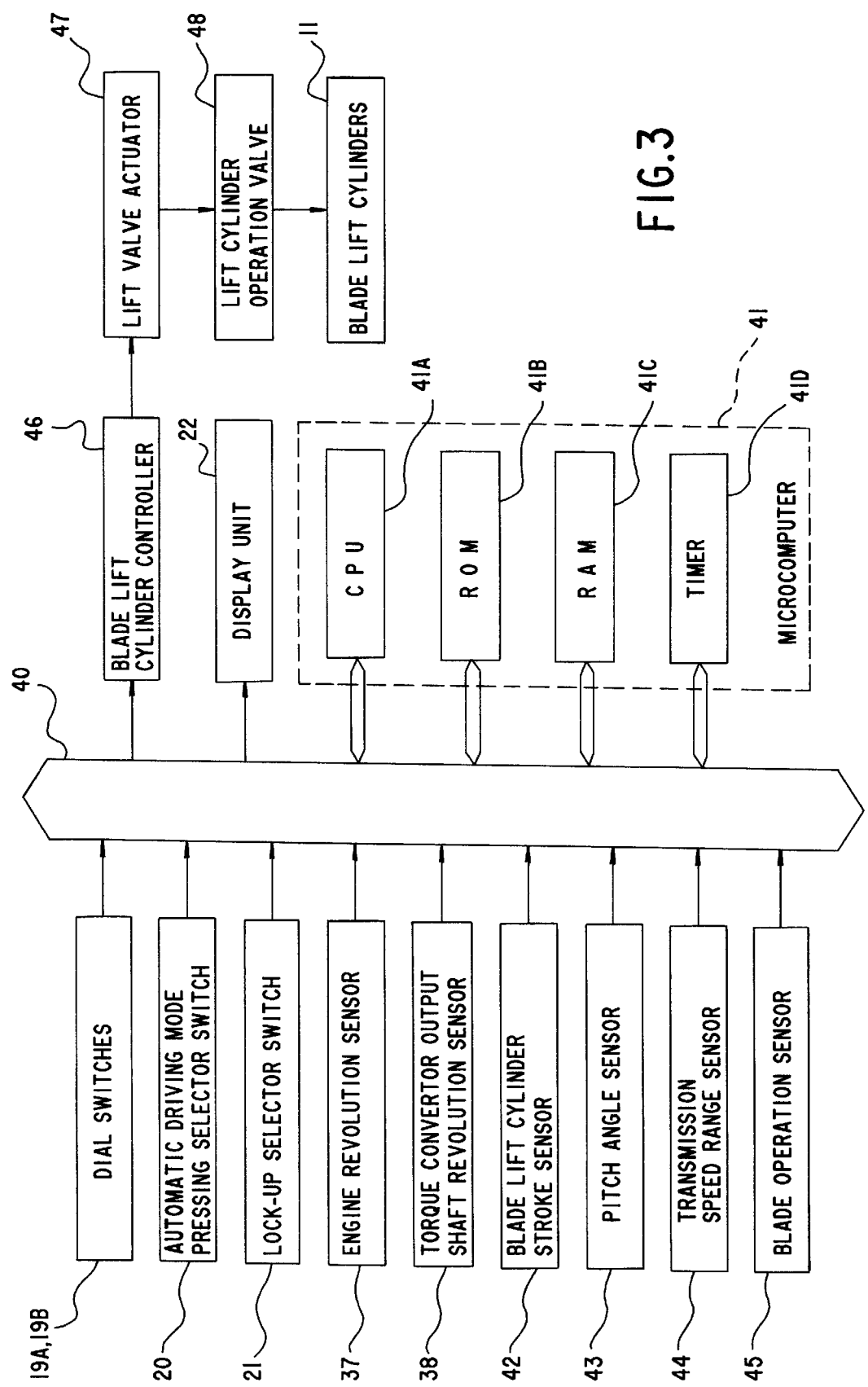

Referring to FIG. 3 which schematically shows the overall construction of the ground leveling control system for a bulldozer of the invention, the following data items are supplied to a microcomputer 41 through a bus 40: (i) dial value data sent from the first dial switch 19A, for informing the magnitude of loads applied to the blade 7 by digging and carrying, the magnitude being set by the first dial switch 19A; (ii) dial value data sent from the second dial switch 19B, for informing a correction value to be added to or subtracted from the set value of the magnitude of loads; (iii) an automatic/manual driving mode instruction sent from the automatic driving mode pressing selector switch 20, for informing whether the automatic driving mode for dozing operation has been selected; (iv) a lock-up (L/U)/torque converting (T/C) instruction sent from the lock-up selector switch 21, for informing whether the lock-up of the torque convertor with a lock-up mechanism 33 has been selected; (v) revolution speed data sent from the engine revolution sensor 37, for informing the revolution speed of the engine 30; and (vi) revolution speed data sent from the torque convertor output shaft revolution sensor 38, for informing the revolution speed of the output shaft of the torque convertor with a lock-up mechanism 33. The following data are also supplied to the microcomputer 41 through the bus 40: (i) stroke positional data sent from a blade lift cylinder stroke sensor 42 that detects the respective stroke positions of the right and left blade lift cylinders 11 for lifting and lowering the blade 7; (ii) tilt angle data sent from a tilt angle sensor 43 that detects the varying tilt angle of the vehicle body 2 inclining back and forth in every movement; (iii) speed range data sent from a transmission speed range sensor 44 that detects a speed range condition of the transmission 34, more specifically, which of three speed ranges in forward and reverse has been selected by changing the gears through the operation of the transmission shift lever 16; and (iv) manual driving operation data from a blade operation sensor 45 that detects whether the blade 7 is set in manual driving operation carried out by the blade control lever 18.

The microcomputer 41 is composed of a central processing unit (CPU) 41A for executing a specified program; a read only memory (ROM) 41B for storing the above program and various maps such as a curved engine characteristic map and curved torque convertor characteristic map; a random access memory (RAM) 41C serving as a working memory necessary for executing the program and as registers for various data; and a timer 41D for measuring elapsed time for an event in the program. The program is executed in accordance with (i) the dial value data on the magnitude of loads applied to the blade 7 by digging and carrying; (ii) the dial value data on a correction value to be added to or subtracted from the value of the magnitude of loads; (iii) the automatic/manual driving mode instruction for dozing operation; (iv) the (L/U)/(T/C) instruction for the torque convertor with a lock-up mechanism 33; (v) the revolution speed data on the engine 30; and (vi) the revolution speed data on the output shaft of the torque convertor with a lock-up mechanism 33; (vii) the respective stroke positional data on the right and left blade lift cylinders 11; (viii) the pitch angle data on the vehicle body 2 inclining back and forth; (ix) the speed range data on the gear condition of the transmission 34; and (x) the manual driving operation data on the blade 7. Then, the amount of lift operation for lifting or lowering the blade 7 is supplied to a blade lift cylinder controller 46, and the right and left blade lift cylinders 11 are driven based on the lift operation amount by means of the controller 46 with the help of a lift valve actuator 47 and a lift cylinder operation valve 48, whereby the blade 7 is lifted or lowered. The display unit 22 displays such information as whether dozing operation by the bulldozer 1 is presently in the automatic driving mode or manual driving mode.

Figure 4A:
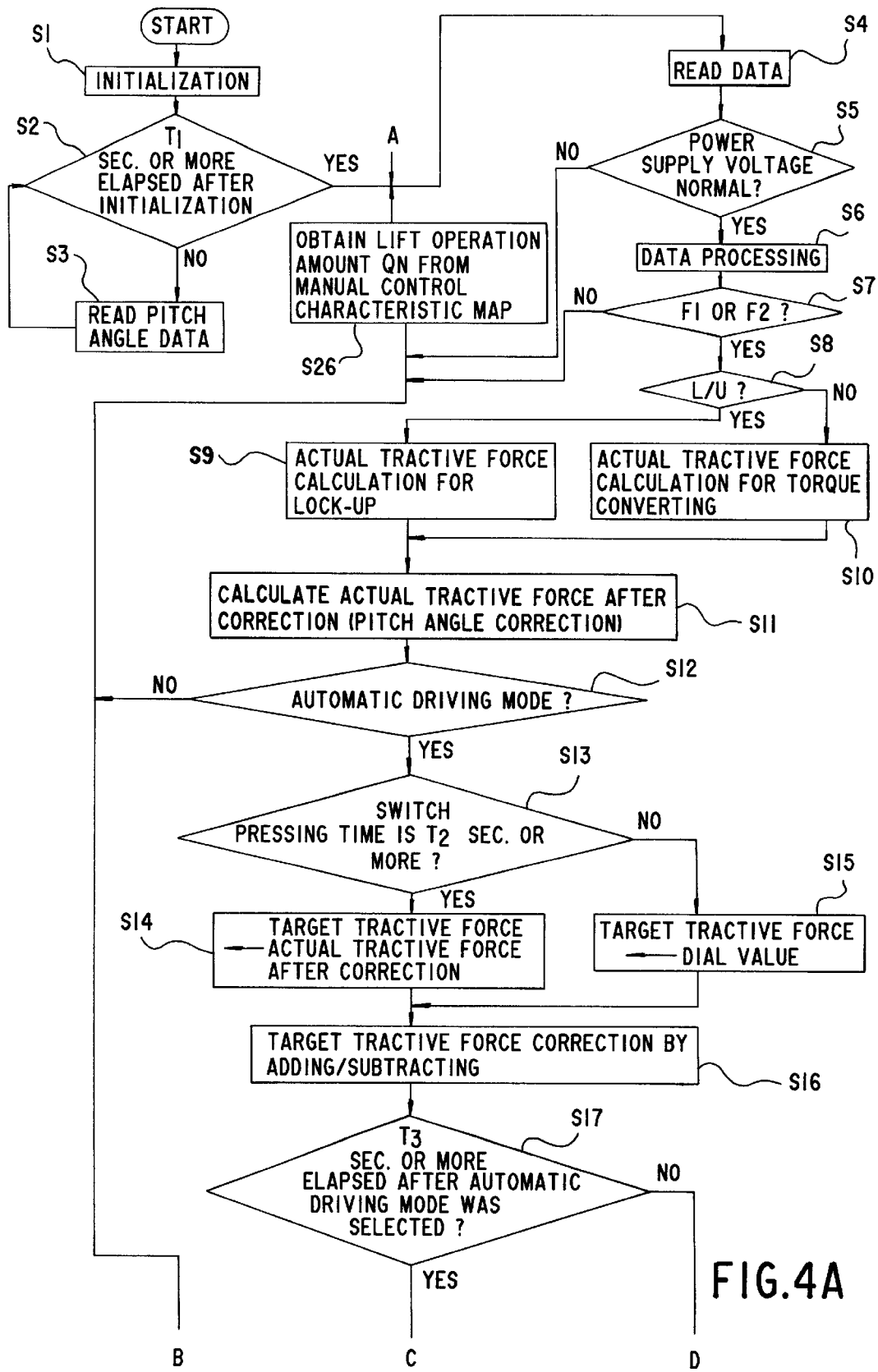
Figure 4B:
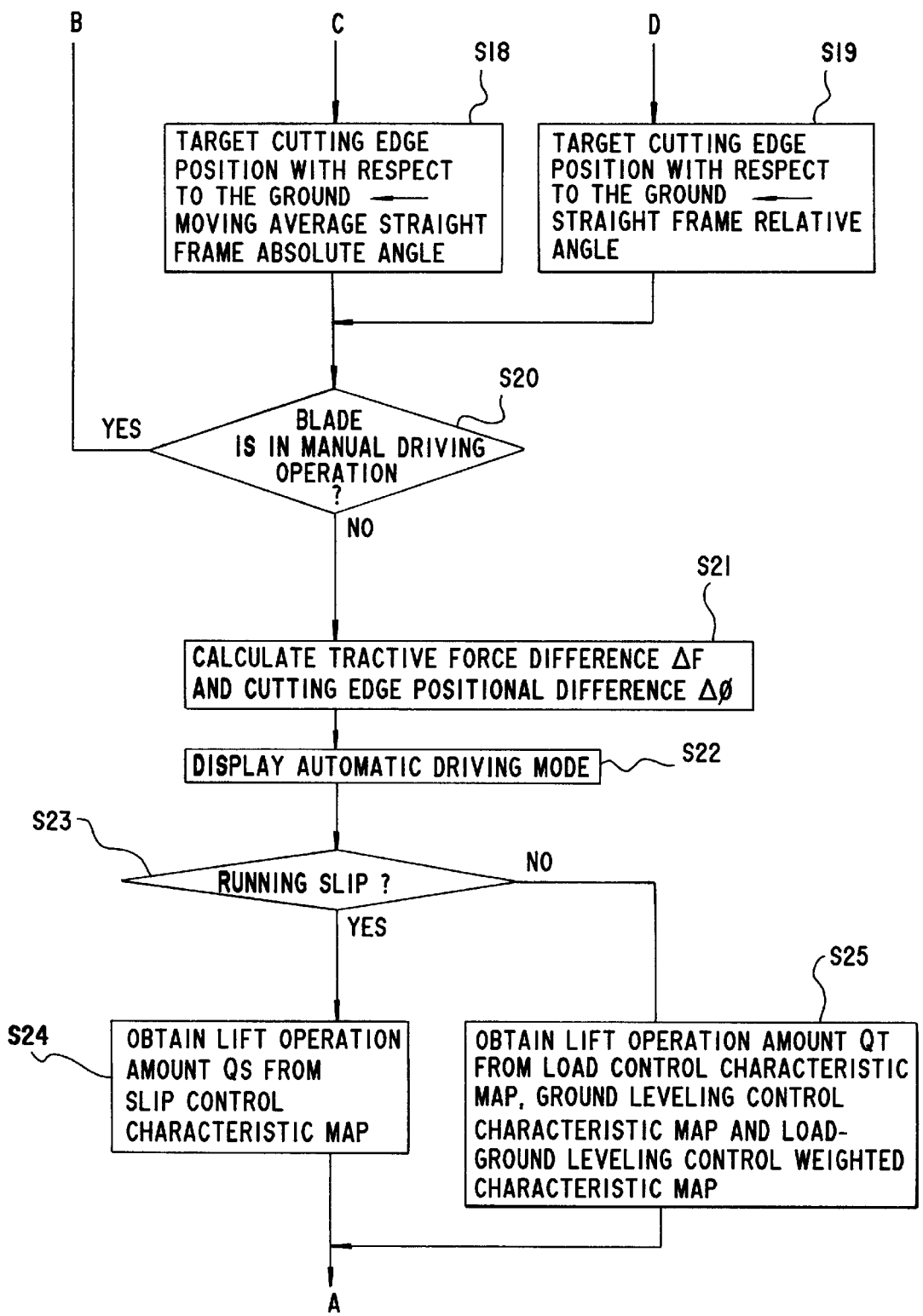

Now reference is made to the flowchart of FIG. 4 for explaining, in detail, the performance of the ground leveling control system for a bulldozer having the above-described arrangement.

Step 1 to Step 3: Power is loaded to start the execution of the specified program and initialization such as clearing all the data of the registers in the RAM 41C is executed. For $t_1$ seconds after the initialization, pitch angle data are sequentially read from the pitch angle sensor 43 as initial values. The reason why pitch angle data are sequentially read as initial values is that the pitch angle of the vehicle body 2 is obtained by frequency separation using the moving averages of the pitch angle data.

Step 4 to Step 6: The following data are firstly read. (i) the dial value data from the first dial switch 19A, for informing the magnitude of loads applied to the blade 7 by digging and carrying, the value of the magnitude being set by the first dial switch 19A; (ii) the dial value data from the second dial switch 19B, for informing a correction value to be added to or subtracted from the set value of the magnitude of loads; (iii) the automatic/manual driving mode instruction for dozing operation from the automatic driving mode pressing selector switch 20; (iv) the (L/U)/(T/C) instruction for the torque convertor with a lock-up mechanism 33 from the lock-up selector switch 21; (v) the revolution speed data from the engine revolution sensor 37, informing the revolution speed of the engine 30; and (vi) the revolution speed data from the torque convertor output shaft revolution sensor 38, informing the revolution speed of the output shaft of the torque convertor with a lock-up mechanism 33; (vii) the stroke positional data from the blade lift cylinder stroke sensor 42 for informing the respective stroke positions of the right and left blade lift cylinders 11; (viii) the pitch angle data from the pitch angle sensor 43 for informing the pitch angle of the vehicle body 2 inclining back and forth; (ix) the speed range data from the transmission speed range sensor 44, for informing the gear condition of the transmission 34; and (x) the manual driving operation data from the blade operation sensor 45, for informing whether the blade 7 is set in manual driving operation. Then, if the voltage of the power source is normal, i.e., more than a specified value and the electronic circuit is in a normal condition, the following data processing is executed.

1. Low frequency elements are derived from the sequentially read pitch angle data by frequency separation, utilizing the method of moving averages, whereby the pitch angle of the vehicle body 2 is obtained.

2. Then, acceleration elements are derived by frequency separation, specifically, by subtracting the above low frequency elements from the pitch angle data sequentially read, whereby the acceleration of the vehicle body 2 is obtained.

3. Based on data obtained by averaging the data on the respective stroke positions of the right and left blade lift cylinders 11, a straight frame relative angle $\phi_1$, which is the average of the angles of the right and left straight frames 8, 9 to the vehicle body 2, is obtained.

4. From the straight frame relative angle $\phi_1$ and the pitch angle of the vehicle body 2 thus obtained, a straight frame absolute angle, which is the average of the angles of the right and left straight frames 8, 9 to the ground, is obtained. Then, a moving average straight frame absolute angle $\phi_2$ is obtained by the method of moving averages in which the straight frame absolute angle which varies every moment is observed for 5 seconds.

Step 7 to Step 11: When the speed range condition (gear condition) of the transmission 34 is the first forward speed F1 or the second forward speed F2, an actual tractive force $F_R$ is calculated in either of the following methods selected depending on whether the (L/U)/(T/C) instruction for the torque converter with a lock-up mechanism 33 is "lock-up" or "torque converting".

1. "Lock-up"

Figure 5:
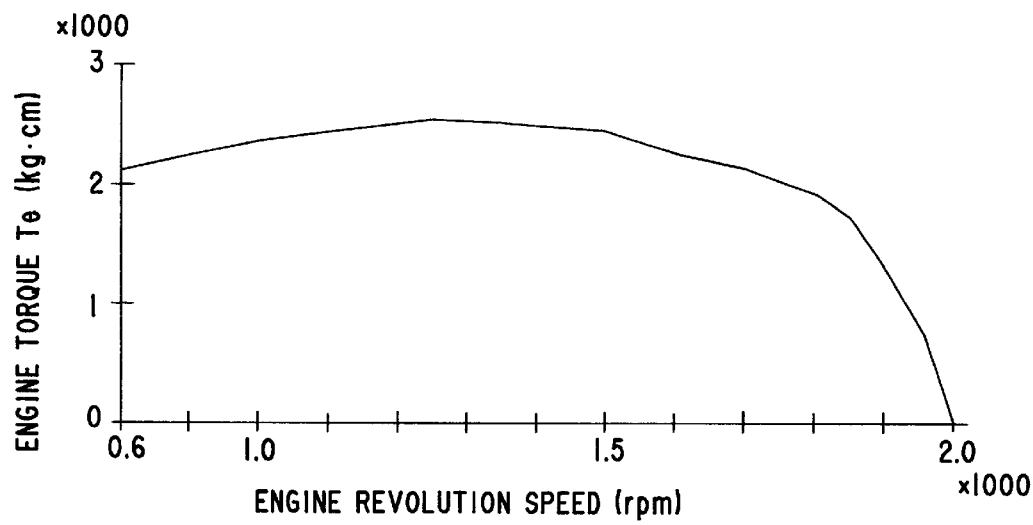
Figure 6:
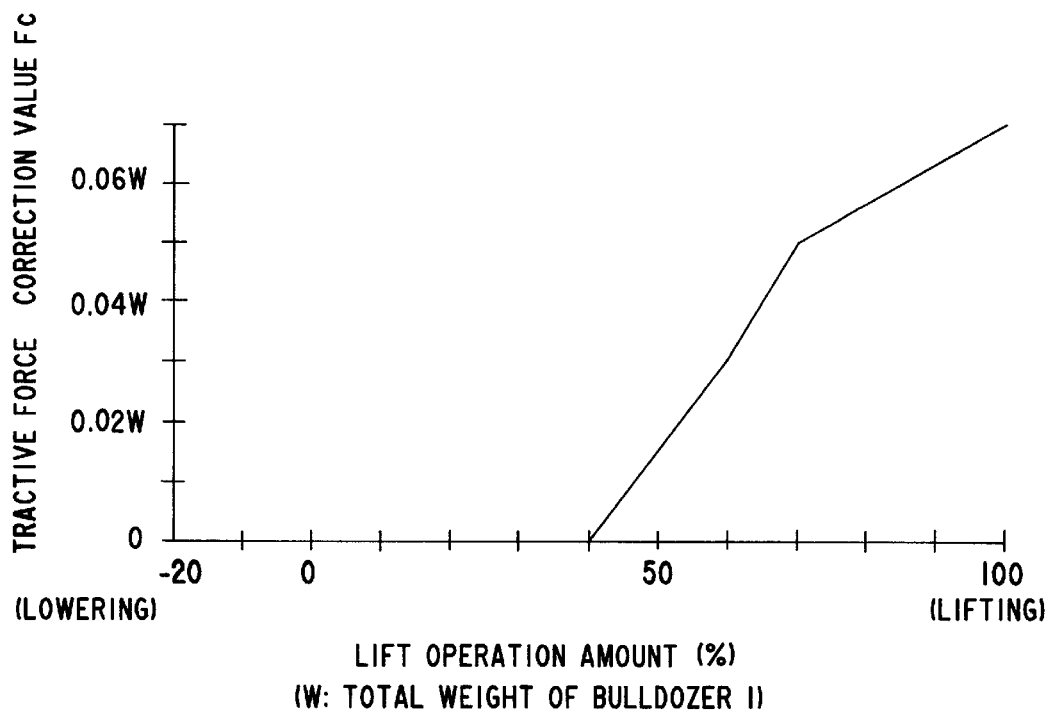

An engine torque Te is obtained from the curved engine characteristic map shown in FIG. 5, using the revolution speed Ne of the engine 30. Then, the engine torque Te is multiplied by a reduction ratio $k_{se}$ provided over the range of the transmission 34, the steering mechanism 35 and the final reduction mechanisms 36 (in other words, the reduction ratio $k_{se}$ between the output shaft of the torque convertor with a lock-up mechanism 33 and the sprockets 6) and further multiplied by the diameter r of the sprockets 6, to thereby obtain a tractive force Fe (=Te×$k_{se}$×r). A tractive force correction value Fc is subtracted from the tractive force Fe, thereby obtaining the actual tractive force $F_R$ (=Fe−Fc). The tractive force correction value Fc corresponds to the use of the hydraulic pumps for operational machines including the hydraulic pump working on the blade lift cylinders 11 in the PTO 32 and can be obtained from the pump correction characteristic map shown in FIG. 6, using the lift operation amount of the blade 7.

2. "Torque converting"

Figure 7:
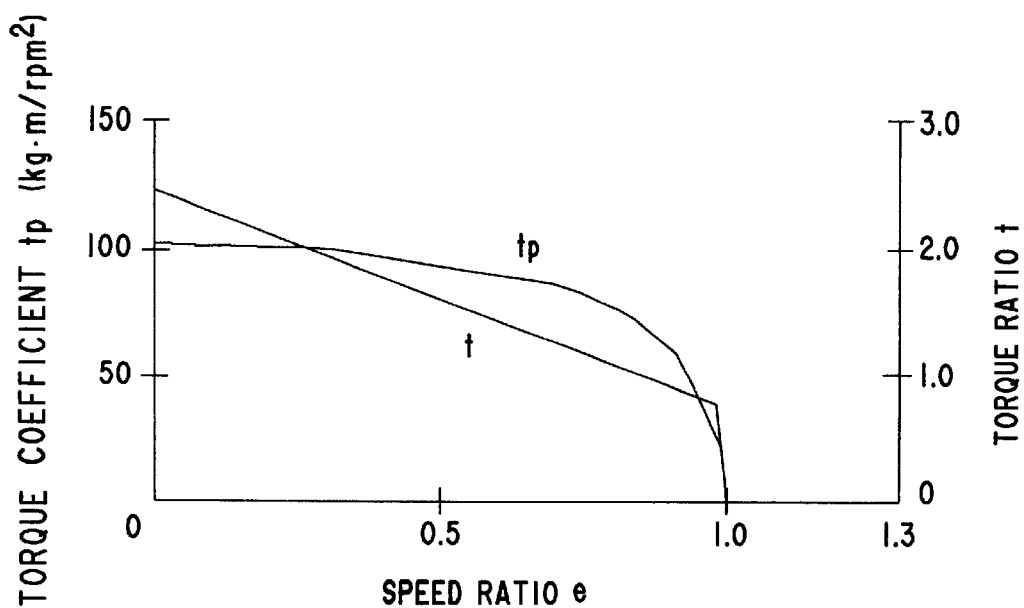

A torque coefficient $t_p$ and torque ratio t are obtained from the curved torque convertor characteristic map shown in FIG. 7, using the speed ratio e (=Nt/Ne) that is the ratio of the revolution speed Ne of the engine 30 to the revolution speed Nt of the output shaft of the torque convertor with a lock-up mechanism 33, and then a torque convertor output torque Tc (=$t_p$×(Ne/1000)$^2$×t) is obtained. Similarly to the case 1, the torque convertor output torque Tc is multiplied by the reduction ratio $k_{se}$ between the output shaft of the torque convertor with a lock-up mechanism 33 and the sprockets 6 and further multiplied by the diameter r of the sprockets 6, to thereby obtain the actual tractive force $F_R$ (=Tc×$k_{se}$×r).

Figure 8:
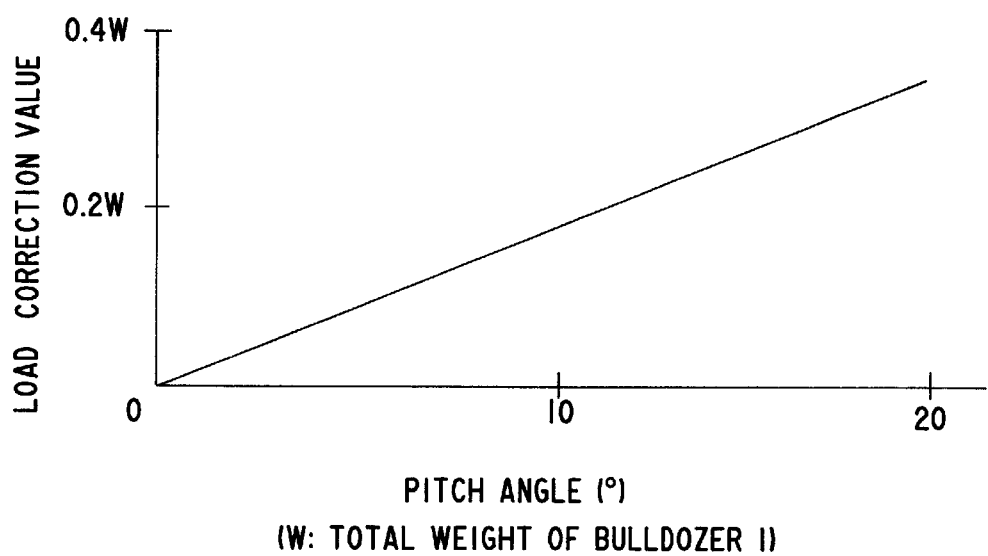

A load correction value which corresponds to the pitch angle of the vehicle body 2 and can be obtained from the pitch angle-load correction value characteristic map shown in FIG. 8, is subtracted from the actual tractive force $F_R$ thus obtained, thereby obtaining an actual tractive force after correction F.

Step 12 to Step 16: If the automatic/manual driving mode instruction for the automatic driving mode pressing selector switch 20 indicates the automatic driving mode of dozing operation, the following steps will be taken.

1. If a pressing time for operating the automatic driving mode pressing selector switch 20 is $t_2$ seconds or more, the actual tractive force after correction F is set as a target tractive force Fo.

2. If the pressing time for operating the automatic driving mode pressing selector switch 20 is less than $t_2$ seconds, a dial value set by the first dial switch 19A, corresponding to the magnitude of loads applied to the blade 7 by digging and carrying is set as the target tractive force Fo.

Then, the target tractive force Fo which has been set is corrected by adding or subtracting a dial value of the second dial switch 19B and is renewed, the dial value being a correction value for the magnitude of loads set by the first dial switch 19A.

Step 17 to Step 19: If the automatic/manual driving mode instruction for the automatic driving mode pressing selector switch 20 indicates the automatic driving mode of dozing operation and $t_3$ seconds or more have elapsed after the automatic driving mode was selected by the above instruction, the moving average straight frame absolute angle $\phi_2$ is set as a target cutting edge position $\phi_0$ with respect to the ground for the cutting edge of the blade 7. On the other hand, when less than $t_3$ seconds have elapsed, the straight frame relative angle $\phi_1$ is set as the target cutting edge position $\phi_0$ with respect to the ground for the cutting edge of the blade 7.

Step 20 to Step 22: When the dozing operation is not in the manual driving operation, that is, the blade 7 is not manually operated by the blade control lever 18, the tractive force difference $\Delta F$ between the target tractive force Fo and the actual tractive force after correction F as well as the positional difference $\Delta\phi$ between the target cutting edge position $\phi_0$ with respect to the ground and the moving average straight frame absolute angle $\phi_2$ are obtained. In the meantime, the display unit 22 indicates that the dozing operation is in the automatic driving mode.

Step 23 to Step 25: From moving average acceleration obtained by applying the method of moving averages to the acceleration of the vehicle body 2 which has been obtained from the acceleration elements derived from the pitch angle data by frequency separation and the actual tractive force after correction F, shoe slip (i.e., the running slip of the vehicle body 2) is detected as running slip. The detection is judged based on the following conditions.

1. If either of the following conditions is satisfied, the occurrence of running slip is admitted.

(1°≈0.0174G, W: the total weight of the bulldozer 1)

(1) the moving average acceleration a <−4° or (2) the moving average acceleration $\alpha$<−2° and the actual tractive force after correction F>0.6 W 2. If either of the following conditions is satisfied, it is admitted that after occurring, running slip has stopped.

(1) the moving average acceleration a >0.1° or (2) the actual tractive force after correction F> the actual tractive force after correction at the time of the start of running slip F−0.1 W After judging whether or not running slip has occurred based on the foregoing conditions, either of the following steps will be taken in accordance with the judgment.

1. If it is judged that running slip has occurred, a lift operation amount $Q_s$ for lifting the blade 7 is obtained from a slip control characteristic map (not shown) in order to eliminate the running slip by reducing loads applied to the blade 7 by digging and carrying.

2. If it is judged that no running slip has been detected, lift operation amounts $Q_1$ and $Q_2$ are obtained in the following ways.

Figure 9:
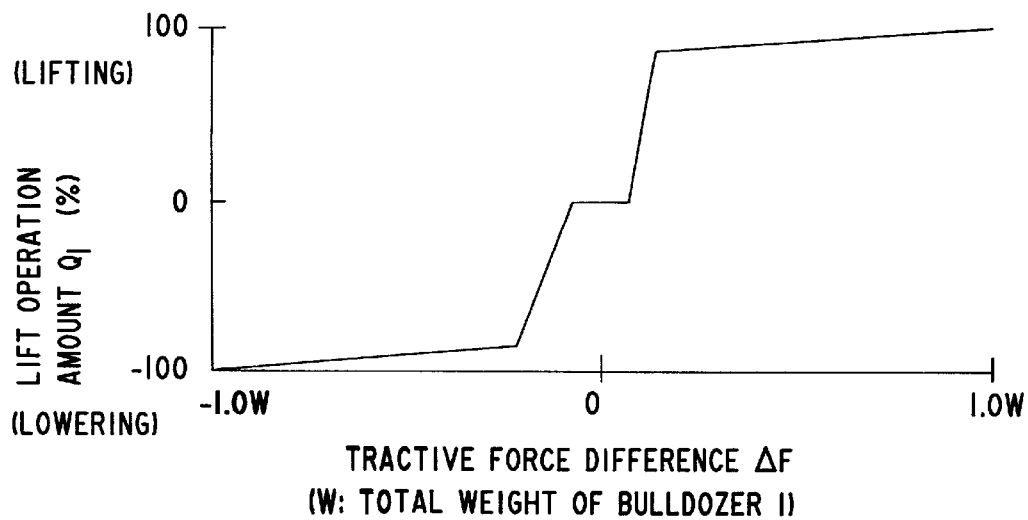

(1) Using the tractive force difference $\Delta F$ between the target tractive force Fo and the actual tractive force after correction F, the lifting amount $Q_1$ for lifting or lowering the blade 7 such that the actual tractive force after correction F becomes coincident with the target tractive force Fo is obtained from a load control characteristic map shown in FIG. 9.

Figure 10:
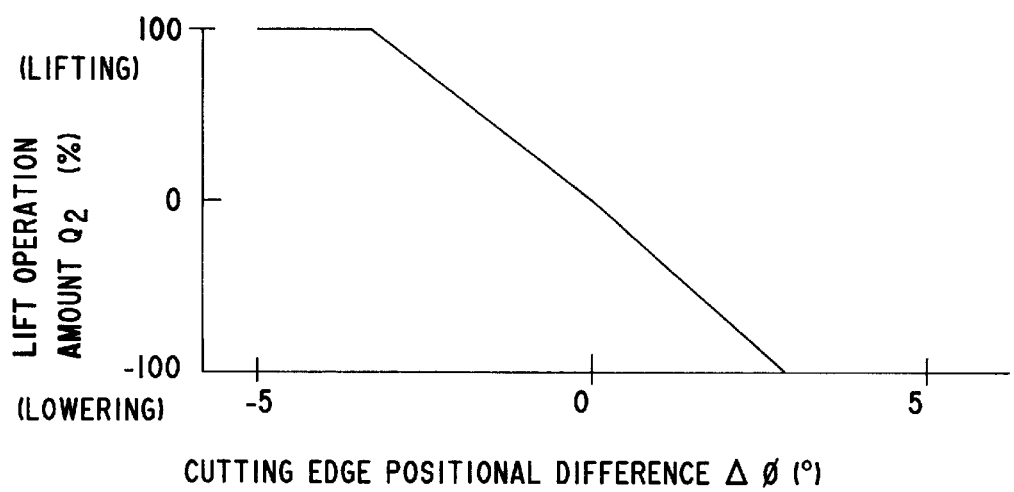

(2) Using the positional difference $\Delta\phi$ between the target cutting edge position with respect to the ground $\phi_0$ and the moving average straight frame absolute angle $\phi_2$, the lift operation amount $Q_2$ for lifting or lowering the blade 7 such that the moving average straight frame absolute angle $\phi_2$ becomes coincident with the target cutting edge position with respect to the ground $\phi_0$ from a ground leveling control characteristic map shown in FIG. 10.

Figure 11:
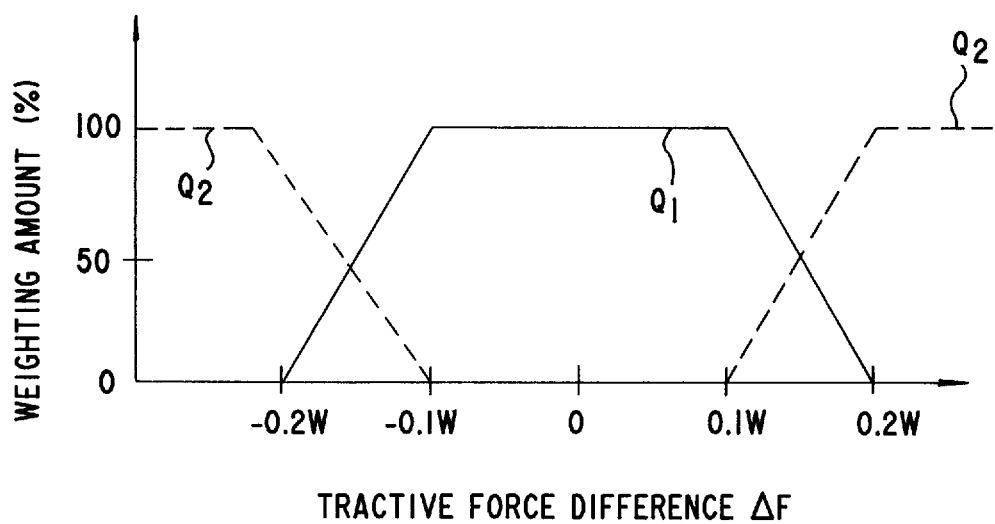

(3) Then, the lift operation amounts $Q_1$, $Q_2$ are weighted in accordance with a load-ground leveling control weighted characteristic map shown in FIG. 11, using the tractive force difference $\Delta F$, whereby a lift operation amount $Q_T$ is obtained. According to the weighted map, when the tractive force difference $\Delta F$ is within the range of ±0.1 W, the load control is performed in preference to the ground leveling control.

When the voltage of the power source is not normal, being less than the specified value and the electronic circuit functions abnormally; when the transmission 34 is in other speed range conditions (gear conditions) than the first forward speed F1 or the second forward speed F2; when the automatic/manual driving mode instruction for the automatic driving mode pressing selector switch 20 indicates the manual driving mode of dozing operation; or when the operation is the manual driving operation that the blade 7 is manually controlled with the blade control lever 18, a lift operation amount $Q_N$ for lifting or lowering the blade 7 is obtained from a manual control characteristic map (not shown), according to the operation amount of the blade control lever 18 in Step 26.

The above-mentioned lift operation amounts $Q_S$, $Q_T$ and $Q_N$ are supplied to the blade lift cylinder controller 46 which actuates the blade lift cylinders 11 through the lift valve actuator 47 and the lift cylinder operation valve 48 in accordance with the lift operation amounts $Q_S$, $Q_T$ and $Q_N$, thereby performing a desired control in lifting or lowering of the blade 7.

Although the actual tractive force is obtained by calculation in the foregoing embodiment, it could be obtained in other ways: for example, a driving torque sensor for detecting the driving torque of the sprockets 6 is employed and the actual tractive force is obtained based on the amount of driving torque detected by the driving torque sensor. Another alternative is that a bending stress sensor for detecting the amount of bending stress generated at the trunnions 10 by the straight frames 8, 9 for supporting the blade 7 is employed and the actual tractive force is obtained based on the amount of bending stress detected by the bending stress sensor.

In the foregoing embodiment, the invention has been particularly described with the power transmission system equipped with the torque convertor having a lock-up mechanism, but the invention is not necessarily limited to this as it may be applied to cases where a torque convertor having no lock-up mechanism or a direct transmission having no torque convertor is employed. When such a direct transmission is employed, the actual tractive force is calculated in the same way as described in the case of "lock-up" in the foregoing embodiment.

Further, in the embodiment, the running slip of the vehicle body 2 is detected by deriving acceleration elements from the pitch angle data output from the pitch angle sensor 43 by frequency separation, it may be detected from the output of an independent acceleration sensor, the output indicating the accelerated condition of the vehicle body 2. Alter-natively, a Doppler speed meter is employed and the running slip is detected by comparing the actual speed of the vehicle body 2 measured by the Doppler speed meter with the traveling speed of the crawler belts 5 for running the vehicle body 2.

Although the target cutting edge position with respect to the ground is set by calculation in the foregoing embodiment, it may be set by a dial switch similarly to the case of the target tractive force.

What is claimed is:

1. A ground leveling control system for a bulldozer, comprising:

(a) a cutting edge position detecting means for detecting a position of a cutting edge of a blade with respect to a ground;

(b) means for determining a straight frame absolute angle that is an angle of straight frames with respect to the ground; and (c) a blade controlling means for controlling the blade to be lifted or lowered such that the cutting edge position of the blade detected by the cutting edge position detecting means is kept coincident with a preset target cutting edge position, wherein the cutting edge position detecting means detects the position of the cutting edge of the blade which is represented by the straight frame absolute angle that is an angle of straight frames with respect to the ground, and wherein the preset target cutting edge position is represented by the straight frame absolute angle, said straight frame absolute angle being an average of angles of right and left straight frames with respect to the ground.

2. The ground leveling control system for a bulldozer as claimed in claim 1, wherein the target cutting edge position is automatically set based on the cutting edge position detected by the cutting edge position detecting means when an automatic driving mode for keeping the cutting edge position of the blade coincident with the target cutting edge position is selected.

3. The ground leveling control system for a bulldozer as claimed in claim 2, wherein the absolute straight frame angle detected as the cutting edge position of the blade by the cutting edge position detecting means is a moving average of angle data, the moving average being obtained by the cutting edge position detecting means in such a way that a relative straight frame angle that is an angle of the straight frames with respect to a vehicle body is first obtained based on a stroke positional data of a blade lift cylinder; the absolute straight frame angle is obtained from the relative straight frame angle and from a pitch angle of the vehicle body when it inclines back and forth; and a value of the absolute straight frame angle, which varies time after time, is obtained and then the moving average of the values over a period of time is calculated.

4. The ground leveling control system for a bulldozer as claimed in claim 2, wherein a relative straight frame angle that is an angle of straight frames with respect to a vehicle body is automatically set as the target cutting edge position at least until a moving average of an absolute straight frame angle that is the angle of the straight frames with respect to the ground is detected as the cutting edge position of the blade by the cutting edge position detecting means, the moving average being obtained by the cutting edge position detecting means in such a way that the relative straight frame angle is first obtained based on a stroke positional data of a blade lift cylinder; the absolute straight frame angle is obtained from the relative straight frame angle and from a pitch angle of the vehicle body when it inclines back and forth; and the value of the absolute straight frame angle, which varies time after time, is obtained and then the moving average of the values over a period of time is calculated.

5. The ground leveling control system for a bulldozer as claimed in claim 1, wherein the preset target cutting edge position is set by a dial switch.

6. The ground leveling control system for a bulldozer as claimed in claim 5, wherein the cutting edge position of the blade detected by the cutting edge position detecting means and the preset target cutting edge position are respectively represented by an absolute straight frame angle that is an angle of straight frames with respect to the ground.

7. The ground leveling control system for a bulldozer as claimed in claim 6, wherein the absolute straight frame angle detected as the cutting edge position of the blade by the cutting edge position detecting means is a moving average of angle data, the moving average being obtained by the cutting edge position detecting means in such a way that a relative straight frame angle that is an angle of the straight frames with respect to a vehicle body is first obtained based on the stroke positional data of a blade lift cylinder; the absolute straight frame angle is obtained from the relative straight frame angle and from a pitch angle of the vehicle body when it inclines back and forth; and a value of the absolute straight frame angle, which varies time after time, is obtained and then the moving average of the values over a period of time is calculated.

8. The ground leveling control system for a bulldozer as claimed in any one of claims 1, 2 or 3, wherein the blade lifting/lowering control by the blade controlling means is performed in an automatic driving mode on condition that a transmission is placed in first forward speed or intermediate forward speed and that the blade is not in manual operation.

* * * * *